United States Patent
Then et al.

(10) Patent No.: US 8,120,219 B2
(45) Date of Patent: Feb. 21, 2012

(54) TRANSMITTER COVER WITH MOUNTING RING

(75) Inventors: Thomas Then, Bad Neustadt (DE); Hubertus Bähr, Bad Königshofen (DE); Hans-Joachim Müller, Burkardroth (DE)

(73) Assignee: Siemens Aktiengesellschaft, München (DE)

( * ) Notice: Subject to any disclaimer, the term of this patent is extended or adjusted under 35 U.S.C. 154(b) by 202 days.

(21) Appl. No.: 12/671,722

(22) PCT Filed: Jul. 30, 2008

(86) PCT No.: PCT/EP2008/059991
§ 371 (c)(1),
(2), (4) Date: Feb. 2, 2010

(87) PCT Pub. No.: WO2009/016201
PCT Pub. Date: Feb. 5, 2009

(65) Prior Publication Data
US 2010/0244600 A1    Sep. 30, 2010

(30) Foreign Application Priority Data
Aug. 2, 2007   (DE) .................... 10 2007 036 241

(51) Int. Cl.
*H02K 5/00* (2006.01)
(52) U.S. Cl. ......................................... 310/89
(58) Field of Classification Search ............. 310/89, 310/88, 67 R
See application file for complete search history.

(56) References Cited

U.S. PATENT DOCUMENTS

| | | | |
|---|---|---|---|
| 3,041,117 A * | 6/1962 | Ramsey | 310/56 |
| 6,664,682 B2 * | 12/2003 | Williams et al. | 310/89 |
| 7,301,253 B2 * | 11/2007 | Tang et al. | 310/91 |
| 7,635,256 B2 | 12/2009 | Then et al. | |
| 7,705,496 B2 | 4/2010 | Zisler et al. | |
| 2002/0117914 A1 | 8/2002 | Doi | |
| 2005/0104458 A1 | 5/2005 | Then et al. | |
| 2009/0026893 A1 | 1/2009 | Zisler et al. | |

FOREIGN PATENT DOCUMENTS

| | | |
|---|---|---|
| BE | 728 846 A | 8/1969 |
| DE | 39 39 868 A1 | 6/1991 |
| DE | 296 20 318 U1 | 2/1997 |
| DE | 196 41 929 A1 | 4/1998 |
| DE | 297 17 415 U1 | 2/1999 |
| EP | 1 441 431 A1 | 7/2004 |
| EP | 1 612 913 A2 | 1/2006 |
| JP | 5288289 A | 11/1993 |

* cited by examiner

*Primary Examiner* — Nguyen N Hanh
(74) *Attorney, Agent, or Firm* — Henry M. Feiereisen; Ursula B. Day

(57) ABSTRACT

The production costs of electrical machines are to be reduced. To this end, it should be possible to use standard transmitters for different axis heights of the electrical machine. The invention therefore provides a transmitter cover for an electrical machine, having a pot-like hood (11) for mounting on the electrical machine and for covering a transmitter, wherein the hood (11) has a central axis. The transmitter cover also has a mounting ring (10) which engages on the hood (11) in an interlocking manner. As a result, the hood (11) is pressed against the electrical machine in the axial direction when the mounting ring (10) is fixed to the electrical machine. This can prevent fastening screws (13) colliding with other fastening screws on the motor, this possibly being the case when only the hood (11) is used to cover the transmitter.

7 Claims, 2 Drawing Sheets

TRANSMITTER COVER WITH MOUNTING RING

CROSS-REFERENCES TO RELATED APPLICATIONS

This application is the U.S. National Stage of International Application No. PCT/EP2008/059991, filed Jul. 30, 2008, which designated the United States and has been published as International Publication No. WO 2009/016201 and which claims the priority of German Patent Application, Serial No. 10 2007 036 241.4, filed Aug. 2, 2007, pursuant to 35 U.S.C. 119(a)-(d).

BACKGROUND OF THE INVENTION

The present invention relates to a transmitter cover for an electrical machine having a shroud, which is in the form of a pot, for mounting on the electrical machine and for covering a transmitter. The present invention also relates to an electrical machine having a transmitter which is attached to the electrical machine with the aid of a transmitter cover such as this.

Servomotors are equipped as standard with different transmitters. The transmitters are generally used as rotation speed measurement devices and/or as angular position transmitters for open-loop and closed-loop control systems for the motor. However, the transmitter may also be a temperature sensor, an acceleration sensor or some other sensor for detection of a physical variable.

Servomotors and other electrical machines have different axis heights, depending on their purpose. This means that the diameters of the electrical machines differ. Nevertheless, it is desirable, if possible, to use the same transmitters and transmitter sizes for the electrical machines which are of different sizes. This reduces the transmitter variance and therefore the production effort for the transmitters and the logistics effort for assembly of the electrical machines.

The transmitters are normally integrated in a transmitter housing with a plug. In the case of motors, they are typically attached to the non-drive end and/or are mounted in the vicinity of the axis. However, if the fixed bearing and the brake for the motor are also located at this non-drive end, then the transmitter attachment screws frequently collide with the attachment screws for the bearing cap and/or brake. When a problem such as this occurs, one is therefore forced to use a different transmitter or a different transmitter housing, in order to allow both the attachment of the bearing cap and of the brake as well as the sealing of the transmitter with respect to the motor, with an appropriate transmitter cover. In this case, it should also be noted that the angular position of the transmitter or of the transmitter housing can generally not be changed, since this affects the operation of angular position transmitters and rotation speed transmitters.

The object of the present invention is therefore to reduce the production effort for electrical machines with transmitters.

SUMMARY OF THE INVENTION

According to the invention, this object is achieved by a transmitter cover for an electrical machine having a shroud, which is in the form of a pot, for mounting on the electrical machine and for covering a transmitter, wherein the shroud has a center axis, and having a mounting ring which acts in an interlocking manner on the shroud so that, when the mounting ring is being attached to the electrical machine, the shroud is pressed against the electrical machine in the axial direction.

It is therefore advantageously possible to avoid a collision between the attachment screws for the transmitter fitting and the attachment screws for the brake or bearing cap, while at the same time providing sealing between the transmitter and the motor. This makes it possible to minimize the transmitter variance because, in some cases, the basic transmitter can be used just with the shroud without the mounting ring, and in other cases the basic transmitter is attached to the housing of the electrical machine via the mounting ring.

A transmitter can be permanently installed in the shroud of the transmitter cover. This reduces the assembly effort and the logistics effort for production of an electrical machine.

The shroud preferably has a flange on which the mounting ring acts when being attached to an electrical machine. This flange has a dual function. In the case of electrical machines in which the mounting ring need not be used, the flange is used for screwing the transmitter cover onto the housing of the electrical machine. However, if the mounting ring has to be used, the flange is used to absorb the attachment force of the mounting ring.

The flange and the mounting ring may have the same material thickness in the axial direction. This leads to the advantage that the flange runs flush with the mounting ring in the fitted state.

According to a further embodiment, the mounting ring may have a conical inner hole, and the flange may have a corresponding external circumferential contour. This interlocking conical seating ensures not only the required concentricity, but also results in a certain sealing effect.

The flange may also have a plurality of mounting holes in recessed areas and the mounting ring may have projections which close the recessed areas and/or the mounting holes in an interlocking manner. The recessed areas, which are used to hold screw heads for direct mounting of the transmitter cover on the electrical machine, are therefore covered and sealed when the mounting ring is used for attachment.

Furthermore, in order to improve the sealing, the mounting ring may have an axially acting first seal for sealing with respect to a housing of the electrical machine, a radially acting second seal for sealing with respect to the shroud, and an axially acting third seal for sealing the depressions of the flange. In consequence, this makes it possible to achieve sufficiently good sealing despite the transmitter housing being formed from two parts, with a shroud and mounting ring.

As has already been indicated above, the transmitter cover according to the invention is used to hold a transmitter and for mounting this transmitter on an electrical machine or on its housing. In this case, it is particularly advantageous for the transmitter to be attached to the non-drive end of the electrical machine.

BRIEF DESCRIPTION OF THE DRAWING

The present invention will be explained in more detail with reference to the attached drawings, in which.

DETAILED DESCRIPTION OF PREFERRED EMBODIMENTS

The exemplary embodiment which is described in more detail in the following text represents one preferred embodiment of the present invention.

Figure 1:
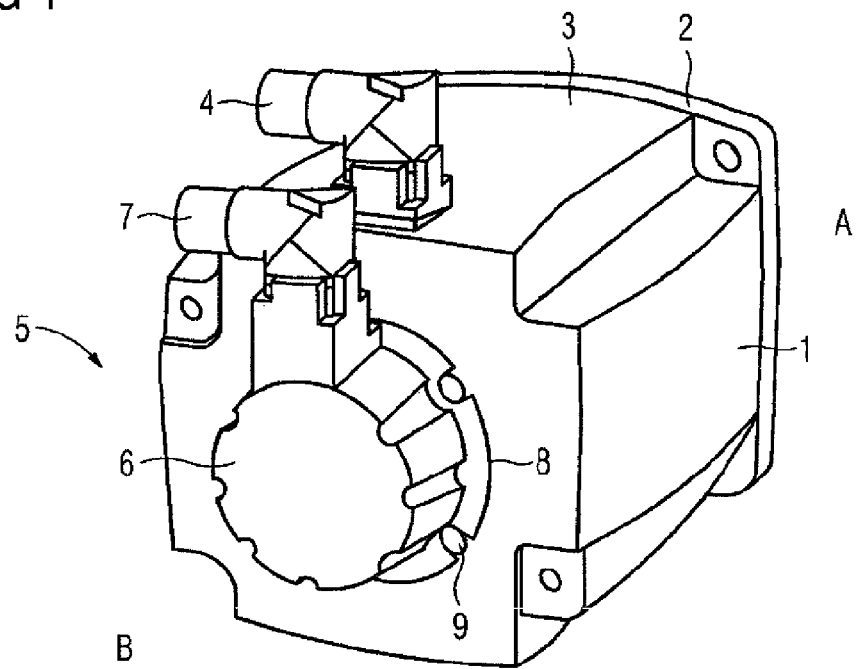
FIG. 1 shows a relatively small servomotor with a transmitter cover without a mounting ring.

The servomotor illustrated in FIG. 1 is shown from the non-drive end. The output driveshaft of the motor projects from the opposite drive end, but cannot be seen in FIG. 1. The motor has a motor housing 1 and, at the drive end, an end frame 2. A motor brake with a brake housing 3 can be located at the non-drive end. A plug 4 for operating the motor and/or the brake is located on the brake housing 3.

In the axial area at the non-drive end of the motor, a transmitter fitting 5 is attached to the end frame 3. In this case, the transmitter fitting 5 comprises a shroud, which may be slightly conical, and under which a transmitter, which cannot be seen in FIG. 1, is located. The transmitter is operated or tapped via a transmitter plug 7 which is attached to the shroud 6. Alternatively, signals can also be interchanged with the transmitter via, for example, the plug 4, if this is appropriately designed.

The transmitter shroud 6 has a flange 8 by means of which it is attached to the end frame 3 with the aid of attachment screws 9. In this case, no mounting ring is used for attachment, since the servomotor has a low axis height, and the attachment screws 9 will therefore not collide with those for attaching the motor brake to the motor.

Figure 2:
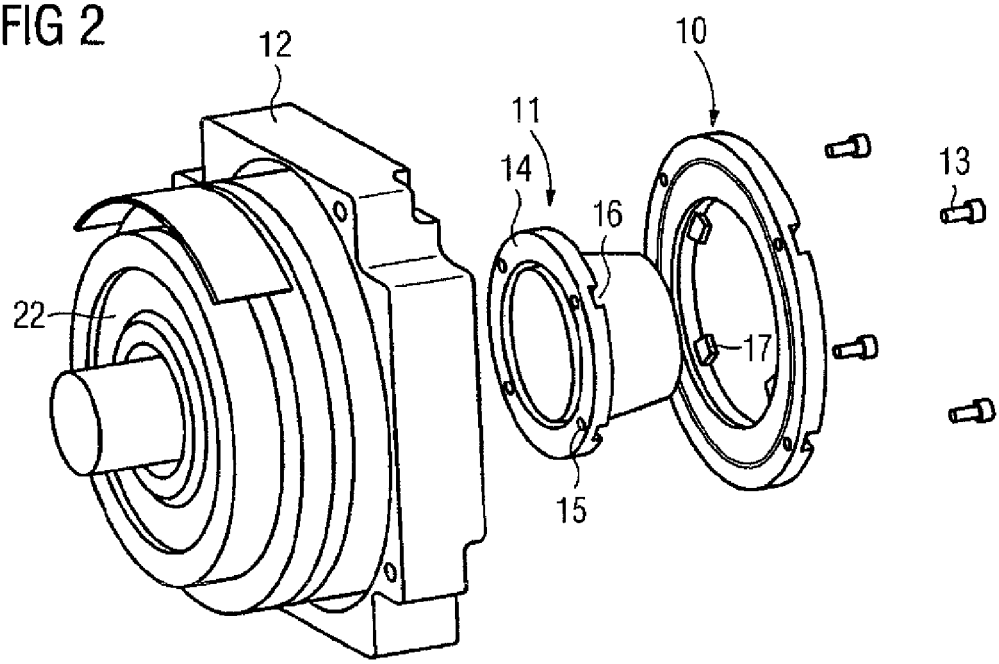
FIG. 2 shows an exploded illustration of an end frame with a brake, to which a transmitter can be fitted by means of a mounting ring.
Figure 3:
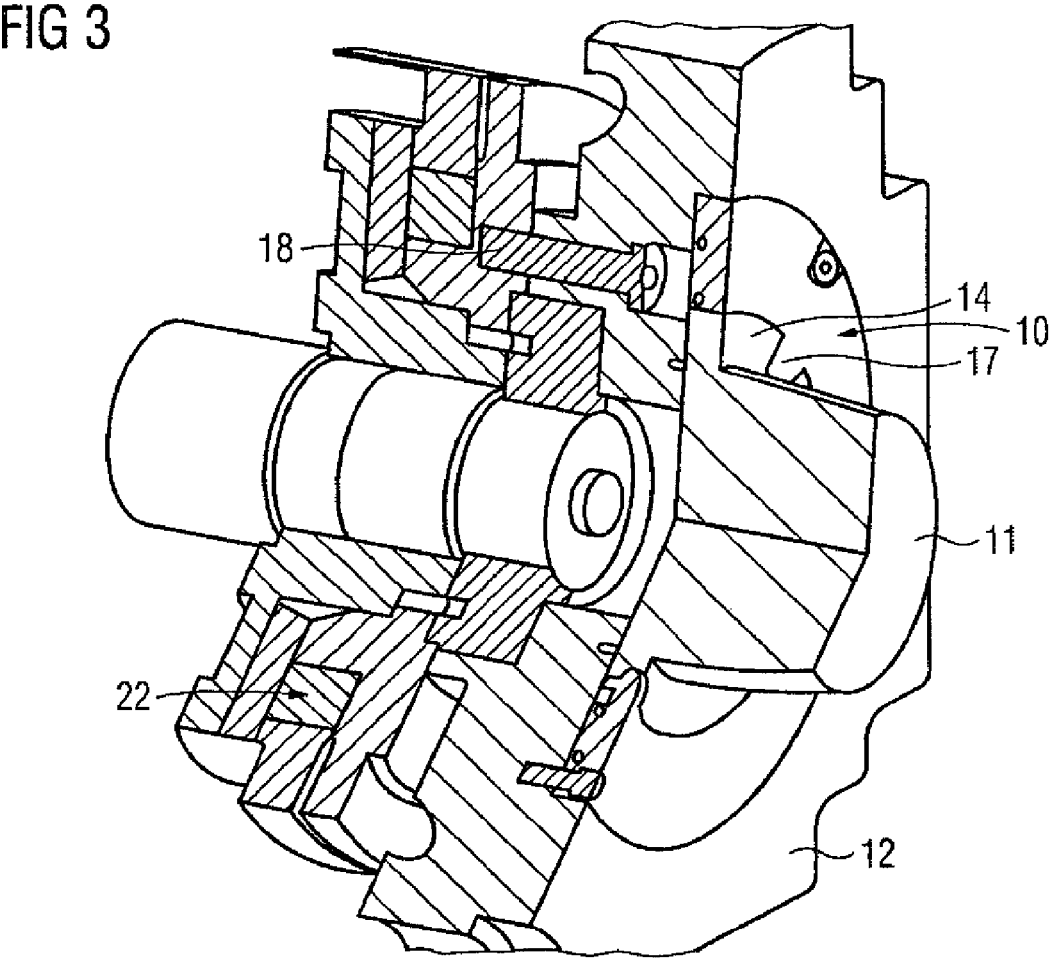
FIG. 3 shows a joined-together illustration as in FIG. 2.

FIGS. 2 and 3 now show the situation in which the transmitter can be mounted on the motor only with the aid of a mounting ring 10. By way of example, this is the situation with machines with a greater axis height. However, for the sake of clarity, FIGS. 2 and 3 do not show the motor, and in fact illustrate only a motor brake 22 with an end frame 12, to which a transmitter shroud 11 is attached by means of a mounting ring with the aid of screws 13. The transmitter housing or the transmitter cover is therefore in this case formed from two parts, as a result of which the same transmitter can also be used for an electrical machine with a different axis height.

The shroud 11 of the transmitter cover contains the actual transmitter. It is fitted permanently into this shroud 11, in advance. Its electrical connections are not shown here, but may be routed past the motor brake 22 or through the end frame 12.

As shown in the example in FIG. 1, in this case as well, the shroud 11 has a flange 14 with mounting holes 15 and depressions 16, in each case in the area of these holes 15. The depressions 16 are used to hold the screw heads of screws which are used as in the example shown in FIG. 1 to attach the shroud 11 directly to the motor housing or the brake housing 12.

In the example shown in FIG. 2, the mounting holes 15 and the depressions are however, not used for attaching the transmitter. The mounting ring 10 therefore has projections 17 which project radially inward on an inner hole, with the contour of the depressions 16, possibly including the holes 15.

In FIG. 3, the motor brake 22 including the transmitter are illustrated partly cut open from the non-drive end perspective. A screw 18 can likewise be seen, by means of which the brake 22 is attached to the end frame 12. This screw can also hold a bearing cover, if the shroud 11 were to be attached directly by its flange to the brake 22. The mounting ring 10, which in this case has already been fitted to the flange 14 of the shroud 11, makes it possible to avoid this. This is because the attachment screws 13 for the mounting ring 10 are located radially further outward than the attachment screws 18 for the motor brake 22.

As can also be seen from FIG. 3, the mounting ring 10 has the same material thickness as the flange 14 of the shroud 11 in the axial direction of the electrical machine. The surfaces of the two elements are therefore flush with one another when they are joined together.

FIG. 3 also shows that the projections 17 on the mounting ring 10 are fitted into the depressions 16 in the shroud 11. This results in an interlocking connection between the mounting ring 10 and the shroud 11. In this case, the projections 17 transmit the mounting force from the mounting ring 10 in the axial direction to the shroud 11 or its flange 14. At the same time, the projections 17 seal the depressions 16 and the mounting holes 15 located in them (cf. FIG. 2).

In addition, the projections 17 also ensure that the shroud 11 and therefore also the transmitter are pressed in the correct position against the motor housing or the end frame, by engaging in the depressions 16.

If required, the position of the transmitter with respect to the motor housing can be secured or predetermined by means of an additional pin in the transmitter. As an alternative to the force being transmitted with the aid of the projections 17, or in addition to this, the force can also be transmitted through a conical inner hole in the mounting ring. The internal diameter of the mounting ring 10 in this case tapers outward. The external circumference of the flange 14 on the shroud 11 has a corresponding conical shape, in the opposite direction. The mounting ring 10 can therefore not only transmit axial force to the flange 14, but the conical seating also ensures better sealing between the two components.

In the examples which are illustrated in FIGS. 1 to 3, the transmitter is always fitted to a motor brake. However, it is likewise possible for the transmitter also to be fitted to a bearing cap with the transmitter cover according to the invention, irrespective of whether it is in two parts or uses only one part.

FIG. 1 shows an embodiment of the transmitter fitting 5 in which electrical lines are routed radially outward. This would mean that a closed mounting ring could not be used for the attachment of a transmitter fitting such as this. For situations such as these, a segment can be cut out in the mounting ring, in such a way that it can also be pushed over the shroud 6 with a radial guide channel for lines, if required.

Figure 4:
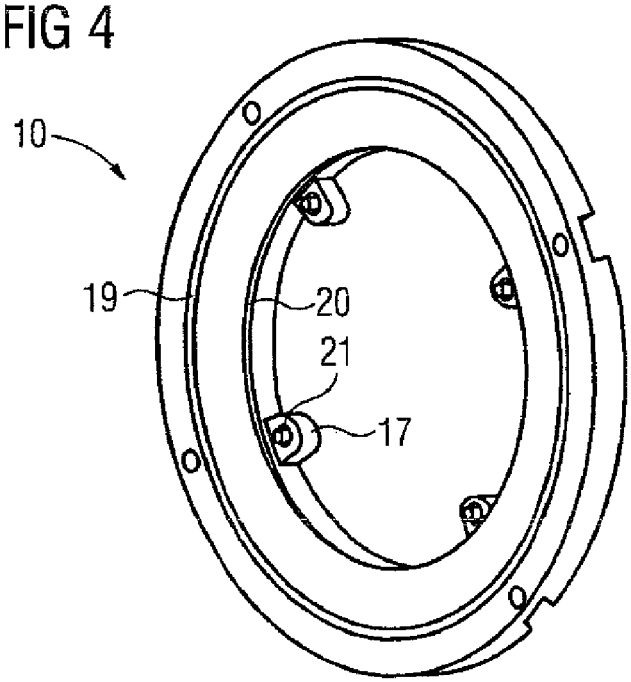
FIG. 4 shows an illustration of the mounting ring, from the motor side, with sealing rings.

One major aspect of the transmitter fitting is frequently the external sealing of the transmitter. FIG. 4 shows a number of sealing measures relating to this, which could be implemented with the aid of the mounting ring. On the one hand, on its side facing the motor, the mounting ring 10 has an outer seal 19 which is located in an annular groove that runs coaxially with the ring. In this case, this is implemented with the aid of an O-ring and is used for axial sealing with respect to the motor housing or brake housing. A second, inner seal 20 is located on the internal circumference of the mounting ring 10, and acts in the radial direction for sealing the mounting ring 10 with respect to the shroud 11. In order to ensure that the mounting holes 15 in the shroud 11 are also closed in a sealed manner when they are not being used, the projections 17 are provided with sealing elements 21. If required, these project not only into the depressions 16 but also into the holes 15.

Therefore, overall, the mounting ring 10 is designed and provided with seals such that the shroud 17 is also sealed with respect to the motor end frame or the end frame when the mounting ring 10 has to be used for transmitter attachment. This makes it possible to provide a modular transmitter fitting system.

What is claimed is:

1. A transmitter cover for an electrical machine comprising:
   a shroud formed as a pot with a center axis defining an axial direction and including a flange having a plurality of mounting holes in recessed areas, said shroud configured to be mounted on the electrical machine and covering a transmitter, and
   a mounting ring interlocking with the shroud and having projections which close the recessed areas or the mounting holes, or both, in an interlocking manner, the shroud being pressed by the flange against the electrical machine in the axial direction when the mounting ring is attached to the electrical machine.

2. The transmitter cover of claim 1, wherein a transmitter is permanently installed in the shroud.

3. The transmitter cover of claim 1, wherein the flange and the mounting ring have identical material thickness in the axial direction.

4. The transmitter cover of claim 1, wherein the mounting ring has a conical inner hole, and the flange has a mating external circumferential contour.

5. The transmitter cover of claim 1, wherein the mounting ring has an axially acting first seal for sealing with respect to a housing of the electrical machine, a radially acting second seal for sealing with respect to the shroud, and an axially acting third seal for sealing the recessed areas of the flange.

6. An electrical machine comprising:
   a transmitter,
   a transmitter cover which includes
   a shroud formed as a pot with a center axis defining an axial direction and including a flange having a plurality of mounting holes in recessed areas, said shroud covering the transmitter, and
   a mounting ring interlocking with the shroud and having projections which close the recessed areas or the mounting holes, or both, in an interlocking manner, the shroud being pressed by the flange against the electrical machine in the axial direction when the mounting ring is attached to the electrical machine,
   wherein the transmitter is attached to the electrical machine with the aid of the transmitter cover.

7. The electrical machine of claim 6, wherein the transmitter is mounted at the non-driven end of the electrical machine.

* * * * *